United States Patent
Lee et al.

(10) Patent No.: US 9,001,634 B2
(45) Date of Patent: Apr. 7, 2015

(54) OPTICAL DISC DRIVE, USER TERMINAL, AND FILE PROCESSING METHOD

(71) Applicant: Toshiba Samsung Storage Technology Korea Corporation, Suwon-si (KR)

(72) Inventors: Jae Young Lee, Anyang-si (KR); Sang Hoon Hyun, Seongnam-si (KR)

(73) Assignee: Toshiba Samsung Storage Technology Korea Corporation, Suwon-si (KR)

(*) Notice: Subject to any disclaimer, the term of this patent is extended or adjusted under 35 U.S.C. 154(b) by 0 days.

(21) Appl. No.: 13/966,372

(22) Filed: Aug. 14, 2013

(65) Prior Publication Data

US 2014/0050067 A1    Feb. 20, 2014

(30) Foreign Application Priority Data

Aug. 17, 2012   (KR) .......................... 10-2012-0090123

(51) Int. Cl.
| | |
|---|---|
| G11B 11/00 | (2006.01) |
| G06F 3/06 | (2006.01) |
| G06F 9/445 | (2006.01) |
| G06F 17/30 | (2006.01) |
| G11B 7/005 | (2006.01) |

(52) U.S. Cl.
CPC .............. *G11B 7/005* (2013.01); *G06F 3/0626* (2013.01); *G06F 3/0643* (2013.01); *G06F 3/0661* (2013.01); *G06F 3/0677* (2013.01); *G06F 9/445* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 6,018,775 | A  * | 1/2000 | Vossler ............................ | 710/1 |
| 2009/0323655 | A1* | 12/2009 | Cardona et al. ............... | 370/338 |
| 2010/0205366 | A1* | 8/2010 | Piepho .......................... | 711/111 |
| 2012/0243394 | A1* | 9/2012 | Lee et al. ........................ | 369/69 |

FOREIGN PATENT DOCUMENTS

KR    10-2008-0067313    7/2008

OTHER PUBLICATIONS

Korean Office Action issued Sep. 2, 2013 in counterpart Korean Patent Application No. 10-2012-0090123 (4 pages, in Korean).

* cited by examiner

*Primary Examiner* — Paul Huber
(74) *Attorney, Agent, or Firm* — NSIP Law

(57) ABSTRACT

Provided is a system including an optical disc drive and a user terminal, and a method of processing a file. The optical disc drive may be connected to the user terminal. According to various aspects, the user terminal may include a file system for identifying a file format of the file recorded on an optical disc. The user terminal may search for a file recorded in an optical disc via the file system, and play the file through downloading.

17 Claims, 5 Drawing Sheets

OPTICAL DISC DRIVE, USER TERMINAL, AND FILE PROCESSING METHOD

CROSS-REFERENCE TO RELATED APPLICATION(S)

This application claims the benefit under 35 USC 119(a) of Korean Patent Application No. 10-2012-0090123, filed on Aug. 17, 2012, in the Korean Intellectual Property Office, the entire disclosure of which is incorporated herein by reference for all purposes.

BACKGROUND

1. Field

The following description relates to an apparatus and method of searching for a file without converting the file.

2. Description of Related Art

To provide a file recorded in an optical disc inserted into an optical disc drive to an external user terminal, a file format conversion is generally needed. In particular, the file format may need converting for the user terminal to access the file recorded in the optical disc because the file format of the file recorded in the optical disc may not be included in the file format identifiable by the user terminal.

During conversion of the file the file format must be verified to convert the file. However, this can cause an inconvenience when accessing and converting a large volume file recorded in the optical disc.

SUMMARY

In an aspect, there is provided an apparatus for reading an optical disc, the apparatus including a controller that is configured to communicate with a terminal that comprises a file system for recognizing a file format of a file stored on the optical disc, and a transmitter that is configured to transmit the file of the recognizable file format stored on the optical disc to the terminal.

The recognizable file format may comprise at least one of a media file format based on a universal disc format (UDF) and a media file format based on an international standardization organization (ISO) format.

The terminal may be configured to be connected to the optical disc drive via a wireless communication in a wireless fidelity (Wi-Fi) scheme or a universal serial bus (USB).

The optical disc drive may be configured to provide the file to the terminal via the file system included in the terminal.

In an aspect, there is provided a terminal, including a file downloader comprising a file system that identifies a file format of a file recorded on an optical disc inserted in an optical disc drive, the file downloader being configured to download the file, and a file player configured to search for the file to be played via the file system and to play the file.

The file downloader may be configured to search for the file recorded on the optical disc inserted into the optical disc drive via the file system, and download the file, and the file player may be configured to play the file downloaded from the optical disc drive.

The file downloader may be configured to download a file identified as having a file format of at least one of a media file format based on a universal disc format (UDF) and a media file format based on an international standardization organization (ISO) format.

The file downloader may be configured to provide a user interface which enables a user to search for the file recorded on the optical disc inserted into the optical disc drive, via the file system.

The file downloader may be configured to be connected to the optical disc drive via a wireless communication in a wireless fidelity (Wi-Fi) scheme or a universal serial bus (USB).

In an aspect, there is provided a method of processing a file performed by an apparatus for reading the file from an optical disc, the method including communicating with a terminal that comprises a file system for recognizing a file format of the file stored on the optical disc, and transmitting the file of the recognizable file format stored on the optical disc to the terminal.

The terminal may be configured to search for a file recorded on an optical disc and download the file, via the file system.

The file format may comprise at least one of a media file format based on a universal disc format (UDF) and a media file format based on an international standardization organization (ISO) format.

The terminal may be configured to connect to the optical disc drive via wireless communication in a wireless fidelity (Wi-Fi) scheme or a universal serial bus (USB).

In an aspect, there is provided a method of processing a file performed by a terminal, the method including connecting to an optical disc drive to which an optical disc is inserted, searching for a file recorded on the optical disc inserted into the optical disc drive via a file system stored at the user terminal for identifying a file format of the file recorded on the optical disc, and downloading the file from the optical disc drive.

The downloading may comprise downloading a file identified to be a file format of at least one of a media file format based on a universal disc format (UDF) and a media file format based on an international standardization organization (ISO) format.

The downloading may comprise providing a user interface in which a user searches for the file recorded on an optical disc inserted into an optical disc drive, via the file system.

The connecting may comprise connecting to the optical disc drive via wireless communication in a wireless fidelity (Wi-Fi) scheme or a universal serial bus (USB)

Other features and aspects will be apparent from the following detailed description, the drawings, and the claims.

Figure 1:
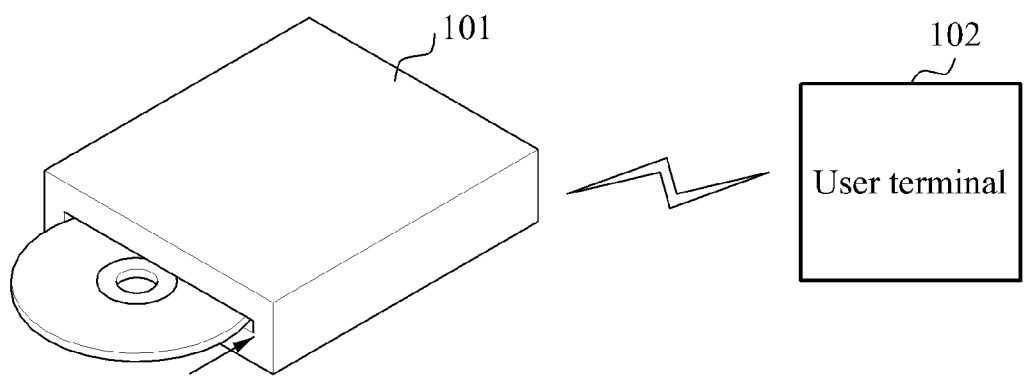
FIG. 1 is a diagram illustrating an example of a system including an optical disc drive and a user terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a system including an optical disc drive 101 and a user terminal 102.

Referring to FIG. 1, the optical disc drive 101 and the user terminal 102 may exist independently, that is, they may be separate devices. For example, the user terminal 102 may be a terminal such as a television (TV), an audio device, a mobile phone, a tablet, a personal computer (PC), a personal digital assistant (PDA), and the like. The optical disc drive 101 may be used to identify a file recorded in an optical disc. The optical disc drive 101 may identify a file such as a compact disc read-only memory (CD-ROM), a digital versatile disc (DVD)-ROM, a Blue-Ray, and the like. In some examples, the optical disc drive 101 may be replaced with a recording device in a different form, such as a hard disc drive (HDD), a solid state drive (SDD), and the like.

The user terminal 102 may include a file system for processing a file recorded in an optical disc that is inserted into the optical disc drive 101. For example, the file system may exist in a form of an application in the user terminal 102.

As an example, the user terminal 102 may include a file system such as a universal disc format (UDF)/international standardization organization (ISO) for processing a file representing a UDF/ISO file format. The user terminal 102 may search for a file recorded in the optical disc inserted into the optical disc drive 101, via a file system stored at the user terminal 102 for identifying the UDF/ISO file format.

According to various aspects, the user terminal 102 may include a file system for identifying a file format of a file recorded in an optical disc, and therefore, may not require an additional process of converting the file format to perform file searching. For example, a file recorded in the optical disc inserted into the optical disc drive 101 may have the UDF/ISO file format. In this case, the user terminal 102 may process the file having the UDF/ISO file format without converting the file format via the file system. As a result, the delay that typically occurs and the resources that are typically used to convert the file format are not performed.

The user terminal 102 may search for a file of the UDF/ISO file format recorded in the optical disc inserted into the optical disc drive 101, and play the file through downloading. Accordingly, the user terminal 102 may play the file that is in the UDF/ISO file format without additional processing.

The optical disc drive 101 and the user terminal 102 may be connected to each other via a wireless communication scheme or a wired communication scheme. For example, the optical disc drive 101 and the user terminal 102 may be connected to one another based on a wireless fidelity (Wi-Fi) wireless communication scheme. As another example, the optical disc drive 101 and the user terminal 102 may be connected to each other based on a universal serial bus (USB) wired communication scheme to process a large volume file recorded in an optical disc.

Figure 2:
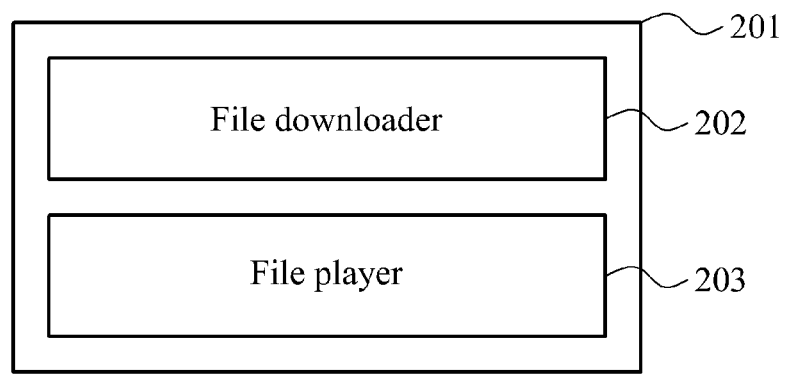
FIG. 2 is a diagram illustrating an example of a user terminal.

FIG. 2 illustrates an example of a user terminal 201.

Referring to FIG. 2, the user terminal 201 may include a file downloader 202 and a file player 203.

The file downloader 202 may search for a file that is recorded on an optical disc inserted into an optical disc drive. For example, the file downloader 202 may use a file system for identifying a file format recorded on the optical disc. The file downloader 202 may download a file to play. Here, the file downloader 202 may download a file that is identified as having a format of at least one of UDF or ISO based media file formats.

The file downloader 202 may provide a user interface in which a user may search for a file recorded in the optical disc that is inserted into the optical disc drive via the file system. In this example, the file downloader 202 may connect to the optical disc drive via Wi-Fi wireless communication or USB wired communication, and download a file to play.

The file player 203 may play a file that is downloaded from the optical disc drive. In this example, the file player 203 may convert a file format of a file that is downloaded from the optical disc drive into a format playable by the user terminal 201.

Figure 3:
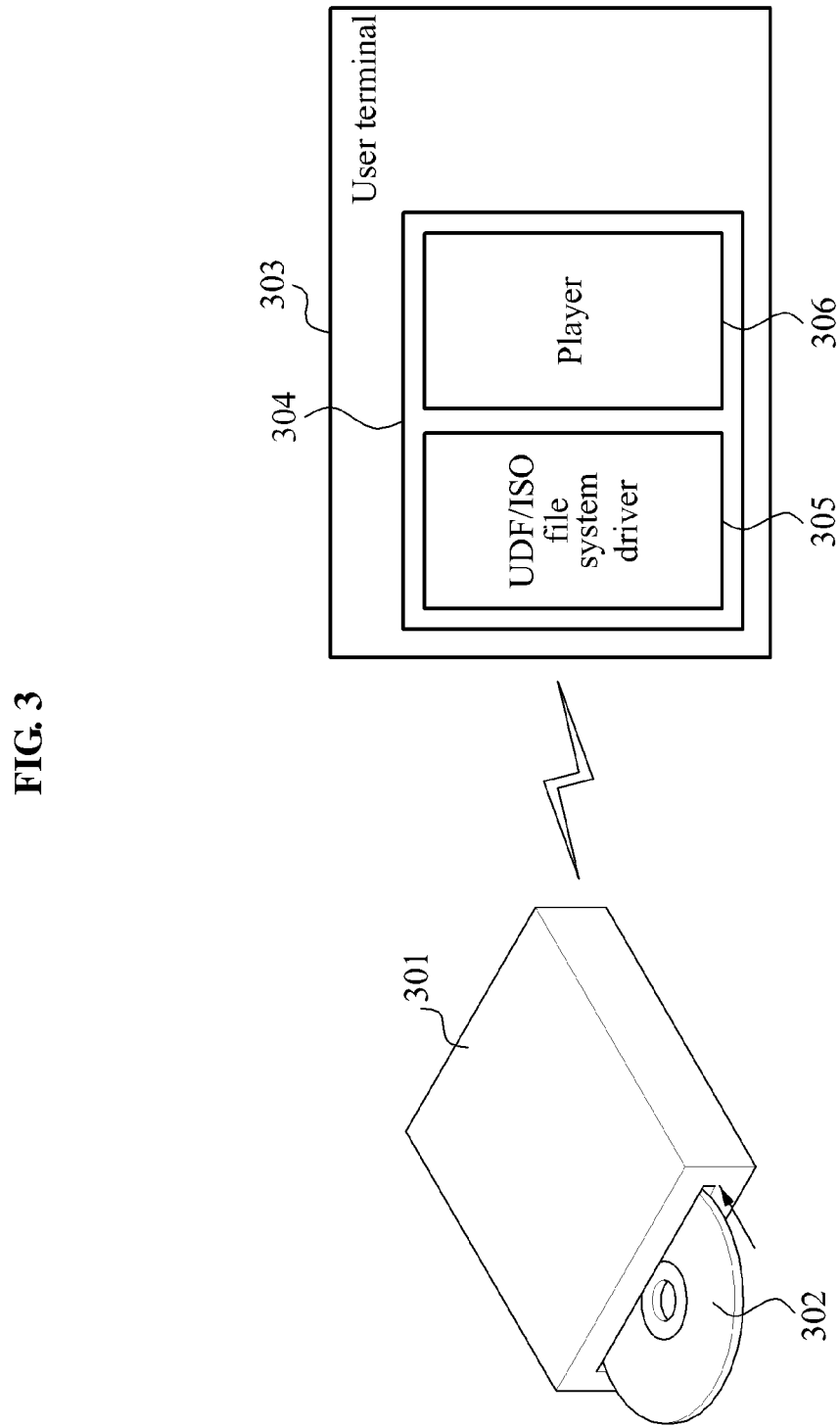
FIG. 3 is a diagram illustrating another example of a system including an optical disc drive and a user terminal including a file system of an optical disc.

FIG. 3 illustrates another example of a system including an optical disc drive 301 and a user terminal 303 including a file system of an optical disc.

Referring to FIG. 3, the user terminal 303 includes an application 304 including a UDF/ISO file system driver 305 and a player 306. The application 304 may be implemented by an additional hardware device.

The user terminal 303 may identify a file that is recorded on an optical disc 302 that is inserted into the optical disc drive 301, via the UDF/ISO file system driver 305 without an additional process. In particular, a process of converting a file format for the user terminal 303 to identify a file recorded in the optical disc 302 may be performed because a file recorded in the optical disc 302 is in the UDF/ISO file format.

The UDF/ISO file system driver 305 may search for a file of the UDF/ISO file format recorded on the optical disc 302 that is inserted into the optical disc drive 301. The UDF/ISO file system driver 305 may provide a user interface for file searching for convenience of the file searching.

The user terminal 303 may search for a file to play via the player 306, and download the file through the UDF/ISO file system driver 305. The UDF/ISO file system driver 305 may connect to the optical disc drive 301, based on the wireless communication scheme, for example, Bluetooth, radio-frequency identification (RFID), Wi-Fi, or the wired communication scheme such as USB. By way of example, a communication scheme for processing a high-speed large volume file may be utilized if a file recorded in the optical disc 302 has a large volume.

Transitively, the UDF/ISO file system driver 305 may download a file to play from the optical disc drive 301, and store the downloaded file in an area to be played. Also, the UDF/ISO file system driver 305 may transfer the downloaded file to the player 306 for the user terminal 303 to play the file recorded in the optical disc 302.

Figure 4:
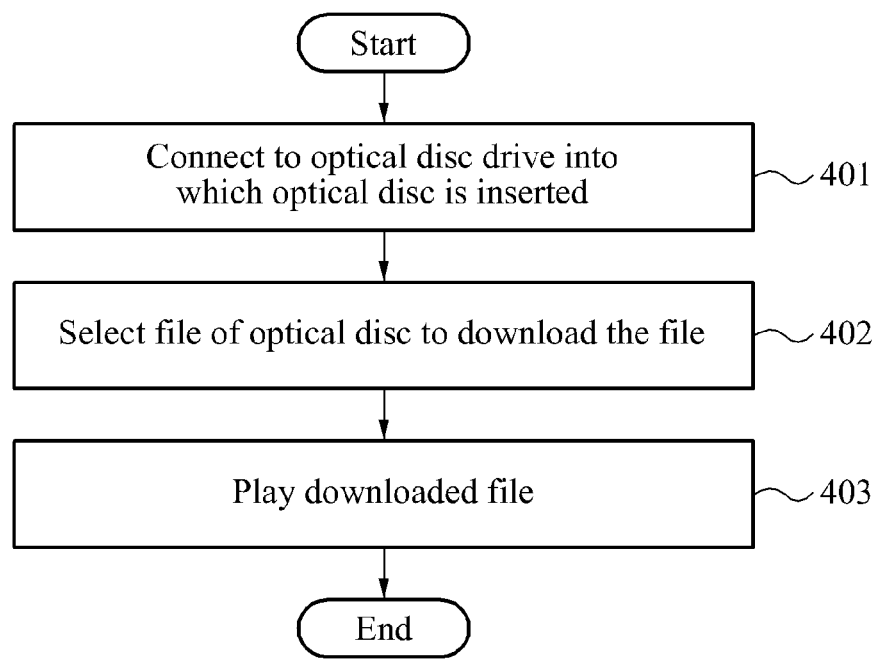
FIG. 4 is a diagram illustrating an example of a method of processing a file performed by a user terminal.

FIG. 4 illustrates an example of a method of processing a file performed by a user terminal.

Referring to FIG. 4, in 401, the user terminal connects to an optical disc drive, for example, based on a wireless communication scheme or a wired communication scheme. Here, the wireless communication scheme may include Wi-Fi for transferring large volume data at a high speed. As another example, the wired communication scheme may include a USB for transferring large volume data at a high speed.

In 402, the user terminal downloads a file stored on an optical disc inserted into the optical disc drive. In this example, the user terminal may include a file system for identifying a file format of a file recorded on an optical disc. The user terminal may identify a file recorded in the optical disc without an additional process for converting a file format of the file. Here, the file system may identify a file that is in the format of at least one of UDF or ISO based media file formats.

The user terminal may be provided with a list of files recorded in an optical disc. For example, the list of files may be displayed through an interface provided by the user terminal. The user terminal may download a file selected from the list of files. Here, the selected file may refer to a file recorded in the optical disc.

In 403, the user terminal plays a file that is downloaded from the optical disc drive. In this instance, the user terminal may convert an UDF/ISO file format to a playable file format to play the file.

Figure 5:
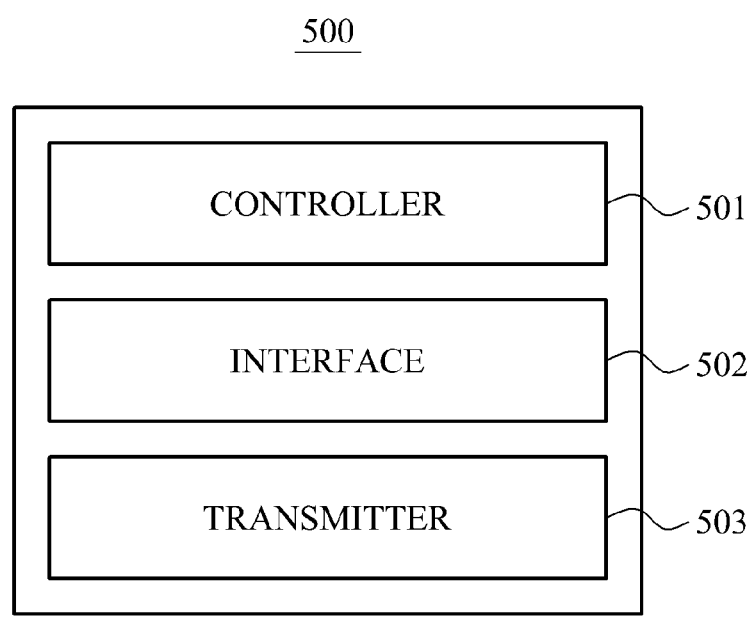
FIG. 5 is a diagram illustrating an example of an optical disc drive.

FIG. 5 illustrates an example of an optical disc drive.

Referring to FIG. 5, the optical disc drive 500 includes a controller 501, an interface 502, and a transmitter 503. For example, the controller 501 may communicate with a terminal that comprises a file system for recognizing a file format of a file stored on the optical disc. The interface 502 may connect with the terminal to download the file of the recognizable file format stored on the optical disc. The transmitter 503 may transmit the file of the recognizable file format stored on the optical disc to the terminal.

It should be appreciated that the examples of FIGS. 1-4 are also applicable to the optical disc drive 500 illustrated in the example of FIG. 5.

According to various aspects, there is provided an apparatus and method that searches for and transmits a file without converting a file format. In this example, a user terminal includes a file system for identifying a file format of a file recorded in an optical disc.

According to various aspects, it is possible to access a file recorded in an optical disc by including a file system for identifying a file format of the file recorded in the optical disc. Accordingly, the user terminal may download a file stored on an optical disc from an optical disc drive that includes the optical disc without the optical disc drive converting the file format.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive configured to read an optical disc, comprising:
    a controller configured to communicate with a terminal comprising a file system configured to recognize a file format of a file stored on the optical disc; and
    an interface directly adjacent to the controller and configured to connect with the terminal configured to download the file of the recognized file format that is stored on the optical disc; and
    a transmitter directly adjacent to the interface and configured to transmit, to the terminal, the file of the recognizable file format that is stored on the optical disc,
    wherein
        the interface is between the controller and the transmitter,
        the recognized file format is a universal disc format (UDF) and an international standardization organization (ISO) format,
        the terminal is configured to
            select a file from a list of files in the optical disc drive in response to being provided with a list of files recorded in the optical disc,
            in response to the file being of the recognized file format, identify the file and search for the file without converting the file format,
            convert the file from a UDF and ISO format into a playable file format in response to the identifying the file,
            download the file, and
            play the file.

2. The optical disc drive of claim 1, wherein the recognizable file format comprises at least one of:
    a media file format based on a universal disc format (UDF) and a media file format based on an international standardization organization (ISO) format.

3. The optical disc drive of claim 1, wherein the terminal is configured to be connected to the optical disc drive via a wireless communication in a wireless fidelity (Wi-Fi) scheme or a universal serial bus (USB).

4. The optical disc drive of claim 1, wherein the optical disc drive is configured to provide the file to the terminal via the file system included in the terminal.

5. A terminal, comprising:
a file downloader configured to download a file of a universal disc format (UDF) and an international standardization organization (ISO) for and comprising a file system configured to identify a file format of the file recorded on an optical disc inserted in an optical disc drive in response to the optical disc drive and the terminal not converting the format of the file,
a UDF/ISO file system driver configured to
search for the file,
provide a list of files to be displayed,
provide a user interface to allow a user to conveniently search for the file,
download the file to play from the optical disc drive,
store the downloaded file in an area to be played, and
transfer the downloaded file to a file player to allow the user to play the file, and
a file player configured to
convert the file format of the file that is downloaded from the optical disc drive into a second format playable by the file player and to play the file.

6. The terminal of claim 5, wherein the file downloader is configured to search for the file recorded on the optical disc inserted into the optical disc drive via the file system, and download the file, and
the file player is configured to play the file downloaded from the optical disc drive.

7. The terminal of claim 5, wherein the file downloader is configured to download a file identified as having a file format of at least one of a media file format based on a universal disc format (UDF) and a media file format based on an international standardization organization (ISO) format.

8. The terminal of claim 5, wherein the file downloader is configured to provide a user interface enabling a user to search for the file recorded on the optical disc inserted into the optical disc drive, via the file system.

9. The terminal of claim 5, wherein the file downloader is configured to be connected to the optical disc drive via a wireless communication in a wireless fidelity (Wi-Fi) scheme or a universal serial bus (USB).

10. A method of processing a file performed by an optical disc drive configured to read the file from an optical disc, the method comprising:
communicating with a terminal comprising a file system configured to recognize a file format of the file stored on the optical disc using a controller;
connecting with the terminal configured to download the file of the recognized file format of a universal disc format (UDF) and an international standardization organization (ISO) format that is stored on the optical disc, using an interface directly adjacent to the controller;
selecting a file from a list of files in the optical disc drive in response to being provided with a list of files recorded in the optical disc;
in response to the file being of the recognised file format, the identifying the file and searching for the file without converting the file format;
downloading the file to play from the optical disc drive;
storing the downloaded file in an area to be played;
transmitting, to the terminal, the file of the recognizable file format that is stored on the optical disc using a transmitter directly adjacent to the interface;
converting the file from the UDF and ISO format into a playable file format; and
playing the file,
wherein the interface is between the controller and the transmitter.

11. The method of claim 10, wherein the terminal is configured to search for a file recorded on an optical disc and download the file, via the file system.

12. The method of claim 10, wherein the file format comprises at least one of:
a media file format based on a universal disc format (UDF) and a media file format based on an international standardization organization (ISO) format.

13. The method of claim 10, wherein the terminal is configured to connect to the optical disc drive via wireless communication in a wireless fidelity (Wi-Fi) scheme or a universal serial bus (USB).

14. A method of processing a file performed by a terminal, the method comprising:
connecting to an optical disc drive to which an optical disc is inserted;
selecting a file from a list of files in the optical disc drive in response to being provided with a list of files recorded in the optical disc;
identifying a file format of a file recorded on the optical disc in response to the optical disc drive and the terminal not converting the format of the file and in response to the file being of a recognized format of a universal disc format (UDF) and an international standardization organization (ISO) format;
searching for the file recorded on the optical disc inserted into the optical disc drive via a file system stored at the terminal that is configured to identify a file format of the file recorded on the optical disc;
downloading the file from the optical disc drive;
storing the downloaded file in an area to be played;
transmitting, to the terminal, the file of the recognizable file format that is stored on the optical disc using a transmitter;
converting the file from the UDF and ISO format into a playable file format; and
playing the file.

15. The method of claim 14, wherein the downloading comprises:
downloading a file identified to be a file format of at least one of a media file format based on a universal disc format (UDF) and a media file format based on an international standardization organization (ISO) format.

16. The method of claim 14, wherein the downloading comprises:
providing a user interface in which a user searches for the file recorded on an optical disc inserted into an optical disc drive, via the file system.

17. The method of claim 14, wherein the connecting comprises:
connecting to the optical disc drive via wireless communication in a wireless fidelity (Wi-Fi) scheme or a universal serial bus (USB).

* * * * *